United States Patent [19]

Kondou

[11] Patent Number: 4,840,804

[45] Date of Patent: Jun. 20, 1989

[54] METHOD OF DEHYDRATING FOODS IN MELTED ERYTHRITOL

[75] Inventor: Tsutomu Kondou, Sagamihara, Japan

[73] Assignees: Mitsubishi Chemical Industries Limited; Nikken Chemicals Company, Limited, both of Japan

[21] Appl. No.: 180,479

[22] Filed: Apr. 12, 1988

[30] Foreign Application Priority Data

Apr. 14, 1987 [JP]  Japan .................................. 62-91600

[51] Int. Cl.$^4$ ............................ A23B 7/02; A23L 1/09
[52] U.S. Cl. ...................................... 426/103; 426/89; 426/310; 426/426
[58] Field of Search ....................... 426/89, 93, 94, 96, 426/103, 302, 310, 426

[56] References Cited

U.S. PATENT DOCUMENTS

| | | |
|---|---|---|
| 2,420,517 | 5/1943 | Brandner et al. .................... 426/426 |
| 3,671,266 | 6/1972 | Cooper et al. ......................... 426/93 |
| 3,904,774 | 9/1975 | Dymsza .................................. 426/426 |

*Primary Examiner*—Donald E. Czaja
*Assistant Examiner*—Helen Pratt
*Attorney, Agent, or Firm*—Jordan B. Bierman

[57] ABSTRACT

A dehydrated food which is obtained by cooking a food material selected from among, for example, flesh or fish meat, vegetables, fruits, nuts and dough for fried bun or fried cake in erythritol instead of an edible oil employed in a conventioal frying process; and thus has a surface formed by the erythritol. This dehydrated food has a crispy texture and a prolonged shelf life. Further it is low-caloric compared with conventional food products fried in an oil and thus preferable from the viewpoint of maintaining the health.

7 Claims, No Drawings

METHOD OF DEHYDRATING FOODS IN MELTED ERYTHRITOL

BACKGROUND OF THE INVENTION

1. Field of the Invention

This invention relates to a dehydrated food. More particularly, it relates to a dehydrated food which is obtained by cooking a food material selected from among, for example, meat, seafood, vegetables, fruits, nuts or dough for fried bun or fried cake, in erythritol instead of an edible oil with is usually employed as a heating medium.

2. Prior Art

A fried food is generally prepared by cooking a food material in an edible oil, which is used as a heating medium, at a temperature of approximately 150° to 200° C. Frying in an oil and fat is superior to other cooking procedures aiming at gelatinization to $\alpha$-type of starch or denaturation of protein, such as smothering or roasting, since the former procedure, wherein a heating medium of a high temperature is directly in contact with a food material to be cooked, can be completed in a short period of time.

However oil-fried foods such as "agesenbei" (fried rice cake), "karinto" (fried dough cake), potato chips and fried beans would exhibit various off-flavour caused by autoxidation or hydrolysis of fats and oils therein upon prolonged storage. When the deterioration further proceeds, the fats and oils would become toxic and sometimes cause food poisoning.

Recent improvement and diversification of Japanese diets have brought about an increase in obesity, diabetes and cardiac diseases caused by excessive calorie intake. Thus it is not preferable to take a large amount of oil-fried foods which are high-caloric and nutritious. Therefore it should be avoided to take, in particular, animal fats and oils in excess from the viewpoint of preventing geriatric diseases, since they would elevate serum cholesterol level.

Japanese Patent Application (OPI) No. 244/1987 ("OPI" herein refers to unexamined Japanese Patent Publication) has disclosed a process for preparing a dehydrated food by using a sugar alcohol such as D-sorbitol, mannitol or maltitol. However a dehydrated food prepared by using one of these sugar alcohols is disadvantageous in the handleability in cooking, the solidifying behaviors of the cooked material and, in particular, the water absorption properties thereof.

SUMMARY OF THE INVENTION

The present inventors have tried to solve the above-mentioned problems and consequently found that an unexpectedly excellent effect can be achieved by using erythritol (more particularly meso-erythritol which will be simply called erythritol hereinafter) as a heating medium, thus completing the present invention.

Accordingly the present invention aims at providing a dehydrated food which is obtained by cooking a food material selected from among, for example, meat, seafood, vegetables, fruits, nuts and dough for fried bun or fried cake in erythritol heated to 130° to 200° C.; and thus has a surface formed by said erythritol.

DETAILED DESCRIPTION OF THE INVENTION

The food material to be dehydrated in the present invention is selected from among meat, seafood, roots, vegetables, fruits, nuts and dough for fried bun or fried cake, particularly roots such as burdock root, carrot, lotus, etc., or nuts such as peanuts, almonds, etc. Either one of these materials of a combination thereof may be employed. Prior to the dehydration, the food material may be processed to form into an aimed size by cutting or molding and thoroughly drained, if required, similar to a conventional frying process.

The dehydrated food of the present invention is characterized by being dehydrated using erythritol as a heating medium. The erythritol may be molten either by adding a small amount of water thereto and dissolving the same by heating or by directly melting the erythritol per se by heating. The dehydration is effected by heating the erythritol, thus dissolved or molten, to a temperature of 130° to 200° C. and adding the preprocessed food material thereto. Although the heating temperature and heating period vary depending on the food material to be cooked, the cooking may be generally carried out in the same manner as a conventional process wherein oil and fats are used as a heating medium.

The dehydrated food of the present invention shows no sticky feel but an excellent and crispy texture. Further it is scarcely accompanied by browning or Maillard reaction during the cooking process, since it is cooked within a short period of time by using a sugar alcohol, i.e., erythritol as a heating medium. Thus the product, in particular that obtained from, for example, a colored vegetable, has a preferable color. In addition, the dehydrated food has a prolonged shelf life since it is coated with an erythritol film which inhibits the deterioration of the taste with the laspe of time.

As a matter of course, the dehydrated food of the present invention is accompanied by no problem caused by autoxidation of fats and oils even if exposed to air for a long time, different from conventional oil-fried foods.

The present invention is further characterized in that a somewhat sweet flavor originating from erythritol is imparted to the food during the dehydration step. This sweetness is highly advantageous not only in the preparation of a fried cake but also in the application of the obtained product to a precooked food as an ingredient, since the dehydrated food such as vegetables can be reconstituted when immersed in hot water.

As described above, the dehydrated food of the present invention has an excellent taste and a prolonged shelf life. Further it is highly preferable from the viewpoint of health. These advantages makes it extremely useful in the field of food.

To further illustrate the present invention, and not by way of limitation, the following Examples will be given. Unless otherwise indicated, all percents are by weight.

EXAMPLE 1

50 g of erythritol (mfd. by Nikken Chemicals Co., Ltd.) was introduced into a 200 ml tall beaker and melted by heating on an oil bath. When the erythritol reached 160° C., carrot pieces preprocessed to form 20 mm in diameter and 3 mm in thickness, in a wire mesh basket were immersed therein for one minute. Then the carrot pieces were drained and allowed to stand at room temperature overnight while observing the progress of the solidification thereof. Separately some portion of the dehydrated product was stored in a thermostatic chamber at a temperature of 30° C. and at a relative humidity (RH) of 81% for a week to thereby evaluate the hygroscopicity thereof. Table 1 shows the results.

COMPARATIVE EXAMPLES 1 to 4

The procedure of Example 1 was followed except that the erythritol was replaced with various sugar alcohols as shown in Table 1. When mannitol having a higher melting point (167° C.) than other sugar alcohols was employed, however, carrot pieces were immersed therein at a temperature of 180° C. Table 1 shows the results.

When sorbitol, maltitol or a mixture (1:1) thereof was employed, the solidification of the surface layer of each product required 30 minutes to 12 hours. Further the product was sticky like thick malt syrup and thus showed a poor handleability throughout the above period. The product was highly hygroscopic and the surface thereof was dissolved in atmospheric moisture. Furthermore a solution of each sugar alcohol had a high water retention and was hardly dried after once absorbing moisture. Accordingly these sugar alcohols are unsuitable as a heating medium in dehydration.

Mannitol had a high melting point, in spite of the lower viscosity thereof in the molten state compared with sorbitol, maltitol or a mixture thereof. Thus mannitol adhering to the food material would rapidly solidify, even at a slight decrease in temperature, to thereby form a thick and fragile layer. As a result, the final product failed to have such a crispy texture as that of the one obtained by cooking in erythritol.

TABLE 1

|  | Ex. 1 | C.Ex. 1 | C.Ex. 2 | C.Ex. 3 | C.Ex. 4 |
|---|---|---|---|---|---|
| Sugar alcohol[1] | erythritol | D-sorbitol | D-sorbitol maltitol (1:1) | maltitol | mannitol |
| Viscosity (cp)[2] | 4 | 50 | 400 | 1200 | 7 |
| Threading[3] | no | no | a little | yes | no |
| Solidification time[4] | 40–50 sec | 30 min | ca. 12 hr | 1 hr | 15–20 sec |
| Adhesion layer[5] | thin | thick | thick | thick | thick |
| Hygroscopicity[6] (moist. cont. in %) | 5 | 70 | 70 | 30 | 7 |

Note:
[1]Erythritol: mfd. by Nikken Chemicals Co., Ltd. D-sorbitol: do. Maltitol: mfd. by Towa Chemical Industry, Ltd. Mannitol: mfd. by Kishida Chemical Co., Ltd.
[2]Determined at 160 C (mannitol: at 180° C.) with Tokyo Keiki B-type Viscometer.
[3]Threading means a state observed at lifting up carrot from molten sugar alcohol.
[4]Time required for the solidification of sugar alcohol coating on carrot at room temperature.
[5]Thickness of sugar alcohol layer adhering to carrot.
[6]Water (% by weight) absorbed by dehydrated carrot stored at RH 80% and 30 C for 1 week.

EXAMPLE 2

The procedure of Example 1 was followed except that the carrot was replaced with various food materials as shown in Table 2. The residual moisture content was determined by adding each food material to erythritol at 170° C.; taking out the same 10, 20, 30 and 60 sec thereafter; and then vacuum drying the dehydrated product at 80° C. Table 2 shows the results.

Every food sample could be dehydrated by cooking for 10 to 60 sec. Vegetables and fruits cooked for 20 to 30 sec were organoleptically evaluated as preferable, while chicken cooked for 30 to 60 sec was evaluated as tasty.

TABLE 2

| Food material* | Weight (g) | Cooking period (sec) | Moisture after cooking (% by weight) |
|---|---|---|---|
| carrot | 0.6–0.7 | 0 | 87.0 |
|  |  | 10 | 46.0 |
|  |  | 20 | 33.0 |
|  |  | 30 | 21.0 |
|  |  | 60 | 10.0 |
| welsh onion | 0.4–0.5 | 0 | 84.0 |
|  |  | 10 | 36.0 |
|  |  | 20 | 30.0 |
|  |  | 30 | 22.0 |
|  |  | 60 | 1.0 |
| cabbage | 1.0–1.3 | 0 | 88.0 |
|  |  | 10 | 43.0 |
|  |  | 20 | 26.0 |
|  |  | 30 | 12.0 |
|  |  | 60 | 2.0 |
| raw shiitake mushroom | 0.5–0.6 | 0 | 89.0 |
|  |  | 10 | 39.0 |
|  |  | 20 | 35.0 |
|  |  | 30 | 17.0 |
|  |  | 60 | 1.0 |
| apple | 0.6–0.8 | 0 | 85.0 |
|  |  | 10 | 50.0 |
|  |  | 20 | 50.0 |
|  |  | 30 | 30.0 |
|  |  | 60 | 16.0 |
| donut dough | 1.0–1.3 | 0 | 41.0 |
|  |  | 10 | 35.0 |
|  |  | 20 | 20.0 |
|  |  | 30 | 15.0 |
|  |  | 60 | 10.0 |
| prawn | 0.6–0.7 | 0 | 80.0 |
|  |  | 10 | 39.0 |
|  |  | 20 | 31.0 |
|  |  | 30 | 25.0 |
|  |  | 60 | 20.0 |
| chicken | 0.6–0.7 | 0 | 35.0 |
|  |  | 10 | 30.0 |
|  |  | 20 | 26.0 |
|  |  | 30 | 15.0 |
|  |  | 60 | 6.7 |

Note:
Doughnut dough: Cake Family Mix mfd. by Nisshin Flour Milling Co., Ltd.
Other food materials: commercially available.

EXAMPLE 3

600 g of erythritol was introduced into a stainless steel beaker and melted by heating to 150° C. on an oil bath. 50 g portions of commercially available peanuts and almonds were added thereto and fried at 150° C. for ten minutes to thereby give the products of the present invention. Separately, commercially available peanuts and almonds were roasted in a wire mesh baking pan over an open fire for nine minutes and for seven minutes respectively to thereby give control products.

The preferance and quality change of each product thus obtained were examined. The results were as follows.

(1) Preference

The preferences of the products of the present invention and the control ones were evaluated by seven panelists according to a method specified in Preference Inspection Hand-Book, Nikka Giren, Japan. Table 3 shows the results. Thus it was found that both of the peanut and almond products of the present invention were superior to the control ones in the total taste including texture and flavor.

TABLE 3

|  | Peanut (m = 7) | | Almond (m = 7) | |
| --- | --- | --- | --- | --- |
|  | prefer I* to C | prefer C* to I | prefer I* to C | prefer C* to I |
| Immediately after cooking | 7 | 0 | 7 | 0 |
| 30° C. for 7 days | 7 | 0 | 7 | 0 |
| 50° C. for additional 5 days | 7 | 0 | 7 | 0 |

Note:
Determined by pair test specified in Preference Inspection Hane-Book.

*I: Product of the Invention.

C: Control product.

(2) Quality change

The peanut product of the present invention and the control one were packed in a polyethylene bag of 0.03 mm in thickness and stored under severe conditions, i.e., at 30° C. for seven days and at 50° C. for additional five days. Table 4 shows the results.

TABLE 4

|  | Product of invention | Control |
| --- | --- | --- |
| Moisture content (%) | | |
| Starting | 1.19 | 1.72 |
| 30° C. for 7 days | 1.11 | 1.81 |
| 50° C. for additional 5 days | 0.97 | 1.34 |
| POV of fats and oils (meq/kg) | | |
| Starting | 0.98 | 0.88 |
| 30° C. for 7 days | 11.9 | 11.6 |
| 50° C. for additional 5 days | 19.6 | 23.8 |

Note:
Moisture content was determined by drying a ground sample at 90° C. and at 20 mmHg for 5 hours. Peroxide value (POV) was determined according to Standard Fat and Oil Analysis Method established by Japanese Oil and Fat Chemical Society.

The storage under the abovementioned conditions is comparable to the one at 20° C. for approximately 56 days. Table 4 suggests that the product of the present invention was superior to the control one in the shelf life, since the moisture content of the former was less than that of the latter and the POV after storage of the former was lower than that of the latter.

While the invention has been described in detail and with reference to specific embodiment thereof, it will be apparent to one skilled in the art that various changes and modifications can be made therein without departing from the spirit and scope thereof.

What is claimed is:

1. A dehydrated food having a surface which has been at least partially immersed in erythritol at elevated temperature.

2. The food of claim 1 wherein said erythritol is liquid.

3. The food of claim 1 wherein said temperature is 130° to 200° C.

4. The food of claim 1 which is selected from the group consisting of meat, seafood, vegetables, fruits, nuts, dough, cake, roots, and mixtures thereof.

5. A method of dehydrating food comprising at least partially immersing said food in a liquid erythritol at elevated temperature.

6. The method of claim 5 wherein said temperature is 130° to 200° C.

7. The method of claim 5 wherein said food is selected from the group consisting of meat, seafood, vegetables, fruits, nuts, dough, cake, roots, and mixtures thereof.

* * * * *